2,982,745
CATALYZED UREA COATING COMPOSITION

Norman I. Gaynes, 1254 Hedin Place, Rahway, N.J.

No Drawing. Filed Apr. 17, 1958, Ser. No. 729,080

1 Claim. (Cl. 260—21)

This invention relates to improved resinous coating compositions and more particularly to a method of catalyzing a coating composition containing an alkyd resin combined with an amino resin of the urea or urea-formaldehyde type in the presence of an alkyl acid ester of carbon chain length of 2 to produce a fully polymerized cross-linked composition.

Among prior air-drying coating compositions, it has long been recognized that nitrocellulose lacquers dry at room temperature with excellent rapidity. However, such coatings present the disadvantage that any active ketone or ester solvent will immediately dissolve the lacquer film produced therefrom. Enamels and varnishes are other types of air-drying compositions. These, in general, lack the properties of high speed of drying and do not produce a coating having mar resistance or solvent resistance comparable with those normally obtainable only in a baking enamel.

Baking enamels are known in which alkyd resins have been combined with amino resins of the urea, urea-formaldehyde, or melamine types to produce a balanced integrated coating, but these compositions are not curable at room temperatures.

It has formerly been the practice in the industry, where various types of acid catalysts have been used, to ship a two-package unit to the consumer for mixing just prior to use, because of the unstable package life of one of the materials.

It is therefore an object of this invention to provide an organic coating which can be cured relatively rapidly at ambient room temperatures and which will develop properties heretofore only available in coatings cured at elevated temperatures.

Another purpose of the invention is to provide a method of incorporating an acid catalyst in one package to produce a fully balanced coating composition which will withstand lengthy storage in the liquid state without deterioration of the composition and without loss of hardness and solvent resisting properties of the coatings produced therefrom.

Another object of the invention is to provide an alkyd modified urea resin having an air-drying speed at room temperatures approaching that of lacquers and capable of producing a film having improved flexibility, weatherability, and retention of color and gloss.

Still another object of the invention is to provide a fully integrated coating composition having a high airdrying speed at room temperature and capable of producing a coating having high chemical and solvent resistances, and which coating shows excellent adhesion to metal and wood surfaces without a prior coating of a primer.

Other objects and many of the attendant advantages of this invention will readily be appreciated as the same becomes better understood by reference to the following detailed description.

These objects are achieved by combining an alkyd resin, such as for example, a dehydrated castor oil type, with an amino resin of the urea or urea-formaldehyde type in the presence of an alkyl acid ester of carbon chain length of 2, for example phosphoric acid ester, and adding a suitable solvent or solvent mixture.

Coatings produced from the amino resins by themselves are normally brittle and do not usually exhibit maximum adhesion. In order to obtain a balance in properties between toughness and durability, I prefer to blend in with the amino resin, an alkyd resin based on such oils as castor, dehydrated castor, linseed, soya, and the like.

As an alkyd resin, I prefer to use one based on dehydrated castor oil because the properties developed therefrom are somewhat superior to those from resins based on other oils. However, it is also within the scope of this invention to use an alkyd resin based on other oils such as, for example, linseed, soya, and coconut oils, and equivalent results may be obtained for specific applications. An example of an alkyd resin based on dehydrated castor oil which has given excellent results in these compositions is that supplied under the trade name Rezyl 330–5 by American Cyanamid Company.

For an amino resin of the urea type, that supplied under the trade name of Resimene U-933 by Monsanto Chemical Company is preferred. However, satisfactory results can also be obtained with urea resins supplied by Rohm & Haas under the trade name of Uformite, and those known as "Beetle" resins, supplied by American Cyanamid Company.

Butanol is utilized in the inventive compositions because I have found that it contributes toward an improvement in packaged stability.

As an acid catalyst I prefer to use an alkyl acid phosphate of carbon chain length of 2. The inventive composition material may be manufactured to produce a clear coating, or if desired, pigments, either white or colored, may be added.

The composition will contain, in addition to an alkyd resin, an amino resin, a phosphoric acid ester and butanol, a suitable solvent or solvent mixture whereby the essential ingredients will be blended and a solution or mixture formed of viscosity or fluidity such as to enable its application to a surface to be coated, as by brushing, spraying, dipping or otherwise. The solvent or solvent mixture will desirably be of a volatile nature and will act as a vehicle, being wholly or largely dissipated by, for example evaporation at room temperature after application of the composition to a surface for the formation of a film. The solvent may be of any suitable type for the purpose, as for example, xylol, or a mixture of xylol and butanol, and will desirably be a solvent for other ingredients which may be included in the composition, and will be used in an amount with relation to the ingredients to be dissolved such as to give the viscosity or fluidity desired.

In addition to the essential ingredients, as has been indicated, the composition may also contain other ingredients, as for example pigments, etc. etc. Ingredients which may be included in the composition, in addition to those indicated as essential may be included in varying amount as dictated by the various ingredients and the purpose for which the given composition is intended.

The proportions found most suitable are hereinafter set forth in Table I as an illustrative example contemplated by the instant invention, the percentages being by weight:

TABLE I

| | Percent |
|---|---|
| Alkyd resin (dehydrated castor oil type) | 40.00 |
| Amino resin (urea) (urea-formaldehyde) | 40.00 |
| Phosphoric acid ester (ethyl acid phosphate) | 0.60 |
| Xylol | 9.70 |
| Butanol | 9.70 |
| | 100.00 |

It is to be understood that that the proportions given in the above example are preferred, but that the proportions may be varied considerably, with and without ingredients other than those indicated herein as essential. Suitable proportions are from about 10.0% to about 90.0% alkyd resin, about 10.0% to about 90.0% amino resin of the urea or urea-formaldehyde type, about 0.05% to about 4.5% phosphoric acid ester, about 2.0% to about 20.0% xylol and about 1.0% to about 19.0% butanol. The actual composition of the non-volatile content may be varied with satisfactory results over wide limits, depending on the solids required for the degree of viscosity desired.

The ratio of non-volatile constituents to each other may likewise be varied over wide ranges with satisfactory results. Thus, for example, an increase in urea resin content with respect to alkyd resin content will provide a harder, more brittle and more rapidly curing coating. Decreasing the urea resin content in relation to the alkyd resin content will provide a tougher, more durable, more weather resistant coating, but in the latter case the speed of cure will be diminished slightly.

Considering only the essential ingredients, and taking the proportionate content of the alkyd resin content as unity, suitable proportions of ingredients present in the composition in relation thereto may be varied approximately as follows with satisfactory results:

TABLE II

| | Ratio |
|---|---|
| Alkyd resin (dehydrated castor oil type) | 1 part. |
| Amino resin (urea, urea-formaldehyde) | 0.25–2.5 parts. |
| Butanol | 0.08–0.80 part. |
| Alkyl acid phosphate of carbon chain length of 2 | 0.1%–1.0% of amino resin solids. |
| Solvent (xylol) | As required. |

The content of solvents, for example xylol, will be dependent upon the desired method of application, i.e., brushing, spraying, dipping, rolling, etc.

As further examples of satisfactory compositions within the scope of the present invention, the following are disclosed, in addition to Example I listed in Table I:

*Example II*

| Trade Name | Supplier | Chemical Designation | Approximate Composition by Weight, percent |
|---|---|---|---|
| Beckosol 1341-60 | Reichold | Linseed Type Alkyd. | 50.00 |
| Resimene U-933 | Monsanto | Urea Formaldehyde (Amino Resin). | 30.00 |
| Phosphoric Acid Ester | do | | 0.50 |
| Xylol | | | 9.80 |
| Butanol | | | 9.70 |
| | | | 100.00 |

*Example III*

| Trade Name | Supplier | Chemical Designation | Approximate Composition by Weight, percent |
|---|---|---|---|
| Beckosol 1343-50 | Reichold | Dehydrated Castor Oil Alkyd. | 30.00 |
| Resimene U-933 | Monsanto | Urea Formaldehyde (Amino Resin). | 50.00 |
| Phosphoric Acid Ester | do | | .80 |
| Xylol | | | 9.70 |
| Butanol | | | 9.50 |
| | | | 100.00 |

*Example IV*

| Trade Name | Supplier | Chemical Designation | Approximate Composition by Weight, percent |
|---|---|---|---|
| Resinox P-97 | Monsanto | Phenolic Resin. | 45.00 |
| Resimene U-933 | do | Urea Formaldehyde (Amino Resin). | 35.00 |
| Phosphoric Acid Ester | do | | 0.55 |
| Xylol | | | 9.75 |
| Butanol | | | 9.70 |
| | | | 100.00 |

*Example V*

| Trade Name | Supplier | Chemical Designation | Approximate Composition by Weight, percent |
|---|---|---|---|
| Rezyl 387-5 | American Cyanamid. | Soya Type Alkyd. | 30.00 |
| Resimene U-933 | Monsanto | Urea Formaldehyde (Amino Resin). | 50.00 |
| Phosphoric Acid Ester | do | | 0.80 |
| Xylol | | | 9.70 |
| Butanol | | | 9.50 |
| | | | 100.00 |

*Example VI*

| Trade Name | Supplier | Chemical Designation | Approximate Composition by Weight, percent |
|---|---|---|---|
| Rezyl 330-5 | American Cyanamid. | Dehydrated Castor Oil Alkyd. | 20.00 |
| Arochlor 5460 | Monsanto | Chlorinated Biphenyl. | 15.00 |
| Resimene U-933 | do | Urea Formaldehyde (Amino Resin). | 45.00 |
| Phosphoric Acid Ester | do | | 0.75 |
| Xylol | | | 9.85 |
| Butanol | | | 9.40 |
| | | | 100.00 |

The following is an example of an opaque pigmented coating composition within the scope of the present invention:

*Example VII*

| Trade Name | Supplier | Chemical Designation | Approximate Composition by Weight, percent |
|---|---|---|---|
| Rezyl 330-5 | American Cyanamid. | Dehydrated Castor Oil Alkyd. | 34.60 |
| Resimene U-933 | Monsanto | Urea Formaldehyde (Amino Resin). | 27.00 |
| Unitane OR-640 | American Cyanamid. | Titanium Dioxide (Rutile non-chalking). | 20.60 |
| Xylol | | | 9.20 |
| Butanol | | | 8.10 |
| Phosphoric Acid Ester | Monsanto | | 0.50 |
| | | | 100.00 |

One advantage of compositions according to the present invention is their ease of application by any of the accepted means, such as brushing, spraying, rolling, tumbling, etc. Furthermore, with the relatively recent hot spray methods or electrostatic methods of application excellent build and flow of the applied film are obtained.

Another advantage of the invention is the excellent filling properties which it exhibits when used on porous wood surfaces. These properties have permitted the elimination of the need for a preliminary prime coat or a sanding sealer in many types of wood finishing operations.

A still further advantage, due to the balance of alkyd-urea resin combination, is the excellent cold check properties produced. On various mahogany panels tested in laboratory at alternate one hour cycles at 160° F. and —4° F., no cracking or checking developed in 25 complete cycles.

While I have described a specific application of the present invention, obviously many modifications and variations thereof are possible in the light of the above teachings. It is therefore to be understood that within the scope of the appended claim the invention may be practiced otherwise than as specifically described.

I claim:

A coating composition capable of forming a rapidly air drying film, consisting substantially of about 40% of an alkyd resin derived from dehydrated castor oil, about 40% of an amino urea-formaldehyde resin, about 0.60% of an ethyl acid phosphate, about 9.7% butanol, and about 9.7% xylol, to produce a fully balanced integrated coating composition which will withstand lengthy storage in the liquid state without deterioration of the composition, and which, after application, will show no loss of gloss, hardness, toughness chemical resisting properties, color retention or weatherability as compared with a film formed with a freshly manufactured composition.

References Cited in the file of this patent

UNITED STATES PATENTS

| | | |
|---|---|---|
| 2,274,447 | Hodgins | Feb. 24, 1942 |
| 2,526,439 | Thurston | Oct. 17, 1950 |
| 2,541,975 | Bird | Feb. 20, 1951 |
| 2,553,682 | Scholz et al. | May 22, 1951 |
| 2,631,985 | Mullin | Mar. 17, 1953 |